United States Patent [19]

Edmonds, Jr.

[11] 4,373,090

[45] Feb. 8, 1983

[54] ARYLENE SULFIDE POLYMER PREPARATION

[75] Inventor: James T. Edmonds, Jr., Bartlesville, Okla.

[73] Assignee: Phillips Petroleum Company, Bartlesville, Okla.

[21] Appl. No.: 349,275

[22] Filed: Feb. 16, 1982

[51] Int. Cl.$^3$ .............................................. C08G 75/14
[52] U.S. Cl. ...................................... 528/387; 528/388
[58] Field of Search ................................ 528/387, 388

[56] References Cited

U.S. PATENT DOCUMENTS

| | | | |
|---|---|---|---|
| 3,783,138 | 1/1974 | Miles et al. | 528/388 |
| 3,786,035 | 1/1974 | Scoggins | 528/388 |
| 3,884,884 | 5/1975 | Scoggins et al. | 528/388 |
| 3,919,177 | 11/1975 | Campbell | 528/388 |
| 4,024,118 | 5/1977 | Campbell et al. | 528/388 |
| 4,066,632 | 1/1978 | Anderson et al. | 528/388 |
| 4,089,847 | 5/1978 | Edmonds, Jr. et al. | 528/388 |
| 4,096,132 | 6/1978 | Edmonds, Jr. | 528/388 |
| 4,116,947 | 9/1978 | Edmonds, Jr. | 528/388 |

*Primary Examiner*—Melvyn I. Marquis

[57] ABSTRACT

A method for producing arylene sulfide polymer in which an anhydrous reaction mixture containing at least one polyhalo-substituted aromatic compound, at least one organic amide, at least one alkali metal hydroxide, and $H_2S$ is maintained at polymerization conditions for a time sufficient to produce polymer. In a preferred embodiment the reaction mixture contains at least one alkali metal salt derived from a monocarboxylic acid or carbonic acid.

4 Claims, No Drawings

ARYLENE SULFIDE POLYMER PREPARATION

BACKGROUND OF THE INVENTION

This invention relates to methods for producing polymer of arylene sulfide. In one of its aspects, it relates to methods of producing p-phenylene sulfide polymer without requiring a dehydration operation in the process.

Production of polymers of arylene sulfide using reaction components that do not involve water or water of hydration has the advantage of avoiding the expense and time consumption of a dehydration step in the polymerization process.

It is therefore an object of this invention to provide a poly(arylene sulfide) preparation that does not require dehydration of the reaction mixture.

Other aspects, objects and the various advantages of the invention will become apparent upon studying the disclosure and the appended claims.

Statement of the Invention

A method for producing polymers comprising contacting at polymerization conditions an anhydrous reaction mixture comprising at least one polyhalo-substituted aromatic compound, at least one organic amide, at least one alkali metal hydroxide, H$_2$S, and optionally at least one alkali metal salt derived from a monocarboxylic acid or carbonic acid and maintaining the reaction mixture at polymerization conditions for a time sufficient to produce polymer.

p-Dihalobenzenes which can be employed in the process of this invention can be represented by the formula

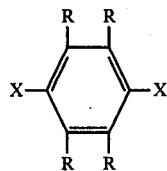

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof. N-methyl-2-pyrrolidone is preferred.

Alkali metal hydroxides which can be employed in the process of this invention include lithium hydroxide, sodium hydroxide, potassium hydroxide, rubidium hydroxide, cesium hydroxide, and mixtures thereof.

Alkali metal carboxylates which can be employed, if desired, in the process of this invention can be represented by the formula RCO$_2$M where R is a hydrocarbyl radical selected from alkyl, cycloalkyl, and aryl and combinations thereof such as alkylaryl, alkylcycloalkyl, cycloalkylalkyl, arylalkyl, arylcycloalkyl, alkylarylalkyl and alkylcycloalkylalkyl, said hydrocarbon radical having 1 to about 20 carbon atoms, and M is an alkali metal selected from the group consisting of lithium, sodium, potassium, rubidium and cesium. Preferably, R is an alkyl radical having 1 to about 6 carbon atoms or a phenyl radical and M is lithium or sodium, most preferably lithium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyl-tetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenyl-cyclohexanecarboxylate, potassium p-tolylacetate, lithium 4-ethylcyclohexylacetate, and the like, and mixtures thereof.

When an alkali metal carboxylate is employed in the reaction it can be generated separately or in situ in the reactor; for example, sodium acetate, a preferred carboxylate, can be generated by reacting acetic acid and sodium hydroxide. The amount of water formed is minor and presents no problems during the polymerization process. When this method is chosen, the quantity of sodium hydroxide to be employed in the polymerization reaction is adjusted upward to compensate for the loss incurred in forming sodium acetate.

The alkali metal carbonate, if desired as a reaction component, is selected from lithium carbonate, sodium carbonate, potassium carbonate, rubidium carbonate, cesium carbonate, and mixtures thereof, with sodium carbonate preferred because of relatively low cost and availability.

Although the components will react in a wide range of relative amounts, for practical reasons the reaction is carried out within the following ranges which are expressed in the table below as the range of amount of each component in mole ratios relative to one mole of hydrogen sulfide.

| Component | Broad Range | Preferred Range |
|---|---|---|
| Alkali Metal Hydroxide | 2.00 to 2.40 | 2.00 to 2.30 |
| Polyhalo-Subst. Aromatic Cpd. | 1.00 to 1.05 | 1.00 to 1.02 |
| Organic Amide | 2 to 10 | 3 to 6 |
| Alkali Metal Carbonate | 1.00 to 3.00 | 1.50 to 2.00 |
| Alkali Metal Carboxylate | 0 to 1.00 | 0.150 to 0.510 |

The components used in the preparation of the arylene sulfide polymer can be charged in any order. However, depending upon the process employed, batch or continuous, practical considerations dictate a more preferred charge order of components. In a batch process all components, except for hydrogen sulfide, are charged to the reactor, the reactor is sealed and the hydrogen sulfide is added. In a continuous process the alkali metal hydroxide, hydrogen sulfide, organic amide and alkali metal salt(s) can be reacted separately in a vessel, the product charged to the reactor as one stream, and the polyhalo-substituted aromatic compound(s) charged to the reactor as another stream.

Although the reaction temperature at which the polymerization is conducted can vary over a wide range, generally it will be within the range of about 125° C. to about 450° C., preferably about 175° C. to about 350° C. The reaction time can vary widely, depending in part on the reaction temperature, but generally will be within the range of about 10 minutes to about 72 hours, preferably about 1 hour to about 8 hours. The pressure should be sufficient to maintain the p-dihalobenzene and organic amide substantially in the liquid phase.

EXAMPLE

A series of polymerization runs was carried out in a two gallon (7.6 liter) stirred autoclave in method A by charging to it at room temperature a specified quantity of sodium hydroxide pellets, N-methyl-2-pyrrolidone, anhydrous sodium acetate powder, and p-dichlorobenzene. The reactor was sealed and pressure tested with dry nitrogen at about 215 psia (1.5 MPa). If pressure tight, the nitrogenpressure was reduced to ambient pressure and the run continued. Hydrogen sulfide was admitted to the nitrogen-filled autoclave, the autoclave was heated to 400° F. (204° C.) and held for 2 hours at that temperature. The autoclave temperature was then raised to 510° F. (266° C.) and held at that temperature for 3 hours. The maximum autoclave pressure at 266° C. ranged from about 220–255 psia (1.5–1.8 MPa) in this series depending upon the total charge of components employed.

Another series of polymerization runs was carried out in the autoclave in method B by charging to it at room temperature a specified quantity of sodium hydroxide pellets, N-methyl-2-pyrrolidone, and anhydrous sodium acetate powder. The autoclave was sealed, pressure tested with dry nitrogen as before, the pressure reduced to ambient pressure, and the hydrogen sulfide charged to the nitrogen-filled autoclave. The autoclave was then heated to 300° F. (149° C.), held there for 15 minutes and the p-dichlorobenzene and 513.5 g of N-methyl-2-pyrrolidone admitted. The autoclave temperature was then raised to 400° F., held there for 2 hours, the temperature raised to 510° F. and held there for 3 hours as before. The maximum autoclave pressure in this series ranged from about 240–255 psia (1.7–1.8 MPa).

In each series, the polymerization runs were concluded by lowering the autoclave temperature to near ambient temperature as quickly as possible by employing cooling means.

Each reaction product was recovered, washed with hot deionized water to remove soluble by-products, dried overnight (about 16 hours) in a vacuum oven at 200° F. (93° C.), and weighed to determine the amount of polymer prepared.

The quantities of reactants employed and the results obtained are given in the Tables. Abbreviations or symbols used in the Table are as follows:

NaOH - sodium hydroxide
$H_2S$ - hydrogen sulfide
DCB - p-dichlorobenzene
NMP - N-methyl-2-pyrrolidone
$NaOA_c$ - sodium acetate (anhydrous)

Melt flow values were determined by the method of ASTM D 1238-70, modified to a temperature of 600° F. using a 5 kg weight, each value being expressed as g/10 minutes.

Mole ratios are calculated relative to $H_2S$ as one.

TABLE 1A

PRODUCTION OF POLY(p-PHENYLENE SULFIDE), NO DEHYDRATION STEP

| Run[a] No. | Solid NaOH Grams | Moles | Mole Ratio NaOH $H_2S$ | $H_2S$ Grams | Moles | DCB Grams | Moles | Mole Ratio DCB $H_2S$ |
|---|---|---|---|---|---|---|---|---|
| 1 | 600 | 15.00 | 2.00 | 255.6 | 7.50 | 1102.5 | 7.50 | 1.00 |
| 2 | 600 | 15.15 | 2.02 | 255.1 | 7.49 | 1124.5 | 7.65 | 1.02 |
| 3 | 606.5 | 15.16 | 2.02 | 255.1 | 7.49 | 1124.5 | 7.65 | 1.02 |
| 4 | 606 | 15.15 | 2.02 | 255.1 | 7.49 | 1124.5 | 7.65 | 1.02 |
| 5 | 618 | 15.45 | 2.06 | 255.6 | 7.50 | 1124.5 | 7.65 | 1.02 |
| 6 | 630 | 15.75 | 2.10 | 255.3 | 7.49 | 1124.5 | 7.65 | 1.02 |
| 7 | 642 | 16.05 | 2.14 | 255.3 | 7.49 | 1124.5 | 7.65 | 1.02 |
| 8 | 654 | 16.35 | 2.18 | 255.3 | 7.49 | 1124.5 | 7.65 | 1.02 |
| 9 | 654 | 16.35 | 2.18 | 255.6 | 7.50 | 1102.5 | 7.50 | 1.02 |
| 10 | 654 | 16.35 | 2.18 | 255.7 | 7.50 | 1113 | 7.57 | 1.01 |
| 11 | 678 | 16.95 | 2.26 | 255.4 | 7.49 | 1124.5 | 7.65 | 1.02 |
| 12 | 606 | 15.15 | 2.02 | 255.5 | 7.50 | 1124.5 | 7.65 | 1.02 |
| 13 | 618 | 15.45 | 2.06 | 255.5 | 7.50 | 1124.5 | 7.65 | 1.02 |
| 14 | 630 | 15.75 | 2.10 | 255.4 | 7.49 | 1124.5 | 7.65 | 1.02 |
| 15 | 642 | 16.05 | 2.14 | 256.6 | 7.50 | 1124.5 | 7.65 | 1.02 |
| 16 | 678 | 16.95 | 2.26 | 255.5 | 7.50 | 1124.5 | 7.65 | 1.02 |

[a]Runs 1–11 according to method A, Runs 12–16 according to method B.

TABLE 1B

PRODUCTION OF POLY(p-PHENYLENE SULFIDE), NO DEHYDRATION STEP

| Run[a] No. | NMP Grams | NMP Moles | Mole Ratio NMP $H_2S$ | Anhydrous NaOA Grams | Anhydrous NaOA Moles | Mole Ratio NaOA $H_2S$ | Grams Polymers | Polymer Prop Melt Flow Grams |
|---|---|---|---|---|---|---|---|---|
| 1 | 3594.5 | 36.26 | 4.80 | 307.6 | 3.75 | 0.500 | 641.3 | 6150 |
| 2 | 3594.5 | 36.26 | 4.84 | 307.8 | 3.75 | 0.501 | 659.7 | 2277 |
| 3 | 3081 | 31.08 | 4.15 | 254.2 | 3.10 | 0.414 | 695.5 | 2411 |
| 4 | 2567.5 | 25.90 | 3.46 | 206.7 | 2.52 | 0.336 | 676.1 | 3514 |
| 5 | 3081 | 31.08 | 4.15 | 254.2 | 3.10 | 0.413 | 667.0 | 1000 |
| 6 | 3081 | 31.08 | 4.15 | 254.2 | 3.10 | 0.414 | 694.9 | 783 |
| 7 | 3081 | 31.08 | 4.15 | 254.2 | 3.10 | 0.414 | 668.9 | 556 |
| 8 | 3081 | 31.08 | 4.15 | 254.2 | 3.10 | 0.414 | 694.3 | 2411 |
| 9 | 3081 | 31.08 | 4.15 | 254.2 | 3.10 | 0.413 | 656.3 | 2857 |
| 10 | 3081 | 31.08 | 4.15 | 254.2 | 3.10 | 0.413 | 679.1 | 3153 |
| 11 | 3081 | 31.08 | 4.15 | 254.2 | 3.10 | 0.414 | 695.7 | 5590 |
| 12 | 3594.5[b] | 36.26 | 4.80 | 307.6 | 3.75 | 0.500 | 675.9 | 3153 |
| 13 | 3594.5[b] | 36.26 | 4.80 | 307.6 | 3.75 | 0.500 | 692.5 | 727 |
| 14 | 3594.5[b] | 36.26 | 4.80 | 307.6 | 3.75 | 0.501 | 717.1 | 493 |
| 15 | 3594.5[b] | 36.26 | 4.80 | 307.6 | 3.75 | 0.500 | 697.12 | 488 |
| 16 | 3594.5[b] | 36.26 | 4.80 | 307.6 | 3.75 | 0.500 | 618.7 | 454 |

[a]Runs 1-11 according to method A, Runs 12-16 according to method B.
[b]Of this charge, 3081 g was charged to the cool reactor and 513.5 g to the reactor at 300° F.

Inspection of the results shows successful runs were obtained at all of the various mole ratios of reactants employed. A direct comparison of method A versus method B is seen only in run 2 of method A versus run 12 of method B. The results suggest that perhaps somewhat higher molecular weight polymer (lower melt flow) is obtained by using method A in which all components are charged to the reactor at one time at room temperature.

The results of runs 12-16 in which method B is employed demonstrate at constant mole ratios of reactants, except the NaOH to $H_2S$ mole ratio, that it is possible to regulate the molecular weight of the polymer by small increases in the NaOH to $H_2S$ mole ratio. Thus a polymer melt flow of 3153 is obtained at a NaOH/$H_2S$ ratio of 2.02:1 in run 12 and a polymer melt flow of 454 is obtained at a NaOH/$H_2S$ mole ratio of 2.26:1 in run 16.

I claim:
1. A method for producing polymers comprising:
   (a) contacting at polymerization conditions an anhydrous reaction mixture comprising:
   (1) at least one polyhalo-substituted aromatic compound,
   (2) at least one organic amide,
   (3) at least one alkali metal hydroxide, and
   (4) $H_2S$, and
   (b) maintaining said reaction mixture at polymerization conditions for a time sufficient to produce polymer.
2. A method of claim 1 wherein reaction mixture components (1), (2) and (3) are contacted to form a first reaction mixture and this first reaction mixture is contacted with component (4).
3. A method of claim 1 wherein reaction mixture components (2), and (3) are contacted to form a first reaction mixture and this first reaction mixture is contacted with component (4) to form a second reaction mixture which is contacted with component (1) in the presence of additional component (2).
4. A method of claim 1, 2, or 3 wherein at least one alkali metal salt derived from a monocarboxylic acid or carbonic acid is present in the reaction mixture.

* * * * *